June 22, 1954   R. E. PETERSON   2,681,554
LIGHTER
Filed Sept. 26, 1949   6 Sheets-Sheet 1

Inventor:
Robert E. Peterson
by his Attorneys,
Flocks and Simon

June 22, 1954 R. E. PETERSON 2,681,554
LIGHTER
Filed Sept. 26, 1949 6 Sheets-Sheet 4

Inventor
Robert E. Peterson
by his Attorneys,
Flocks and Simon

June 22, 1954  R. E. PETERSON  2,681,554
LIGHTER
Filed Sept. 26, 1949  6 Sheets-Sheet 5

INVENTOR.
Robert E. Peterson,
BY
Flocks and Simon.
ATTORNEYS

Patented June 22, 1954

2,681,554

UNITED STATES PATENT OFFICE 2,681,554

LIGHTER

Robert E. Peterson, New York, N. Y., assignor to Repeter Products, Inc., New York, N. Y., a corporation of New York Application September 26, 1949, Serial No. 117,841

8 Claims. (Cl. 67—7.1)

1

The present invention relates to a lighter. More particularly the present invention relates to a pyrophoric lighter of a type especially suitable for the proper and efficient combustion of a gaseous fuel.

In co-pending application Serial No. 553,701, filed September 12, 1944, on which United States Patent No. 2,482,794 issued September 27, 1949, to Robert E. Peterson, there is disclosed a lighter capable of efficiently burning a gaseous fuel such as propane, butane or a suitable mixture thereof.

The lighter disclosed in the aforementioned application includes as one of its features a carbureting device for intimately admixing the gaseous fuel with air to form a combustible mixture, a mixing chamber which receives the gas and air mixture from the carbureting device and a combustion chamber together with a suitable igniting mechanism.

It is one of the objects of the present invention to provide an improved form of operating mechanism for a lighter of the type referred to, which will ensure proper coordination between the carburetion of gaseous fuel and operation of an igniting mechanism.

A second general object of the present invention is to provide a novel timing mechanism which will suitably delay the operation of the igniting mechanism so as to establish the proper phase relationship between the opening of a gas valve and the operation of the igniting mechanism, both of these mechanisms being operated manually by the same means.

A third object of the present invention is to provide in a gas lighter, which includes a control valve, a manually operated means effective to initially energize a spring or its equivalent operative to rotate an igniting mechanism, thereafter open a gas valve and finally release the spring for the operation of the igniting mechanism so that a proper combustible mixture will be produced prior to the igniting mechanism operation.

A fourth object of the present invention is to provide a novel gas valve for a gas fuel lighter, which serves as a pressure regulating mechanism.

Other objects and the nature and advantages of the instant invention will be apparent from the following description taken in conjunction with the accompanying drawings, wherein.

2

Figure 1:
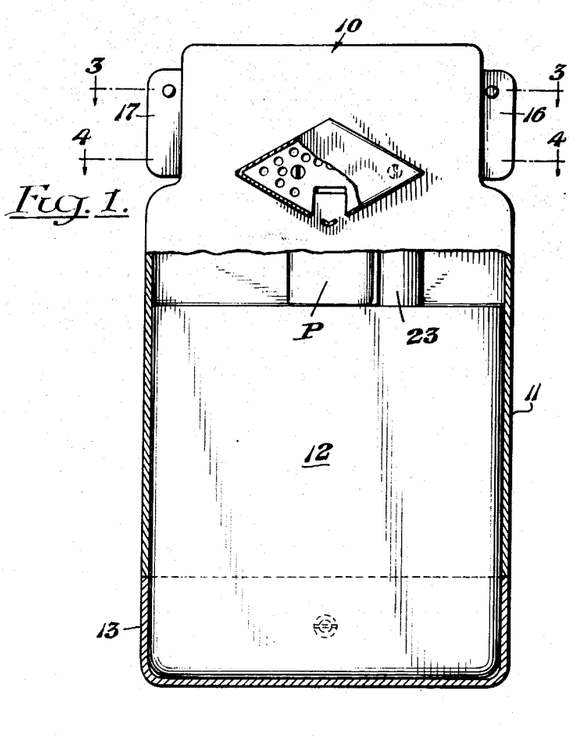
Fig. 1 is a side elevation of the lighter of the present invention partly broken away.
Figure 5:
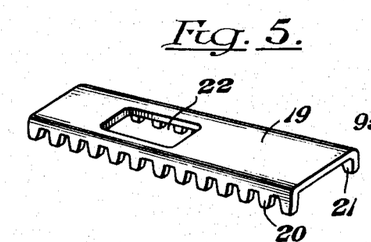
Fig. 5 is a perspective view of the combustion closure member.
Figure 8:
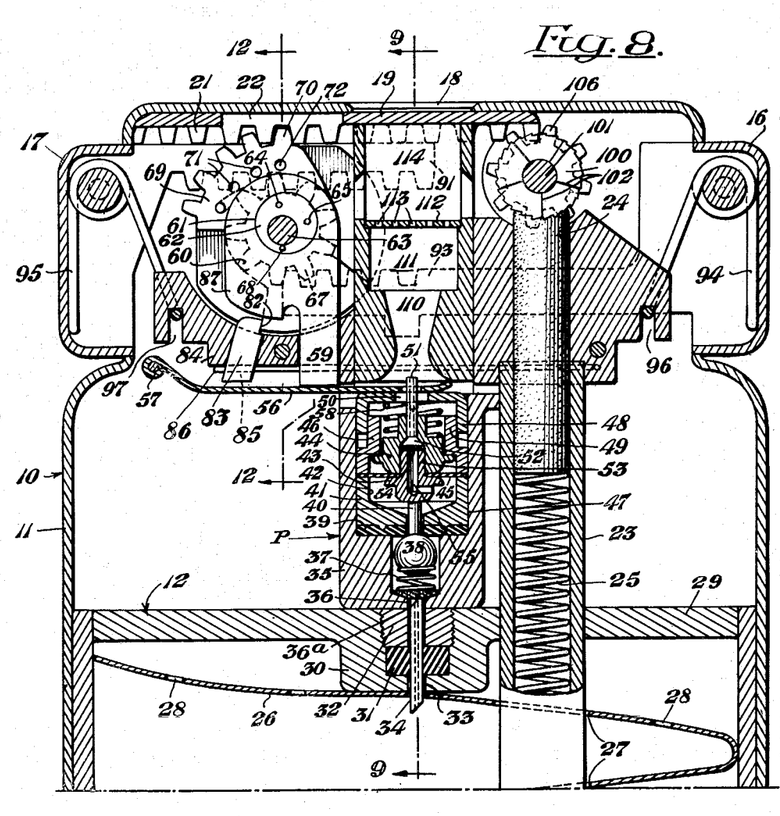
Fig. 8 is an enlarged section of the upper half of the lighter showing the pressure regulator, combustion chamber and operating mechanism.

Referring to the figures of the drawing, and particularly Fig. 1 thereof, the lighter of the present invention is indicated in general at 10. The lighter 10 is provided with an upper casing portion 11 adapted to receive a cartridge 12 and provided with a lower cover portion fitting over the cartridge and indicated at 13. The upper end of the casing 12 is provided with a pair of openings 14 and 15 arranged to receive the slidably manually operable push buttons 16 and 17, respectively. The top of the casing member 11 is also provided with a combustion port 18 and fitted within the top of the lighter case is a closure member for the combustion port, best shown in Fig. 5 and indicated at 19. The closure member 19, as shown, is of a general U-shape in cross-section, being provided on each of its edges with the downwardly extending racks 20 and 21. It is also provided with an opening 22 which, when properly positioned in alignment with the opening 13, serves to permit passage of heat and flame from the upper end of the lighter. The cartridge 12, as best shown in Fig. 8 for example, is provided with a tubular member 23 extending longitudinally through the cartridge top and bottom to form a passage for the conventional flint 24 and also to house the flint spring 25. The cartridge may also be provided with a reinforcing member 26 which is preferably welded inside the cartridge and provided with suitable large openings 27 for the passage of the tube 23 therethrough and with a plurality of smaller openings 28 throughout the length thereof to permit unobstructed passage of liquified gas from one portion of the cartridge to the other. The top 29 of the cartridge is also provided with an integral nipple 30 provided with a sealing member 31 held in position as by a threaded annulus 32, the sealing member 31 normally serving to seal the discharge opening 33. However, as may be understood, the sealing member 31 may be punctured as by a hollow needle 34 when the cartridge 12 is assembled with the remainder of the lighter.

In my copending application Serial No. 117,842 filed September 26, 1949, I have pointed out the problems and difficulties arising from the use of a low boiling point liquid fuel such as liquid propane. In the same application I have also described one type of automatic pressure regulating device that solves the problems and obviates the difficulties. I have found that under certain circumstances it is advantageous to combine with the pressure regulating device a valve which responds to manual igniting operation of the lighter. This combined valve and pressure regulator will now be described.

Figure 9:
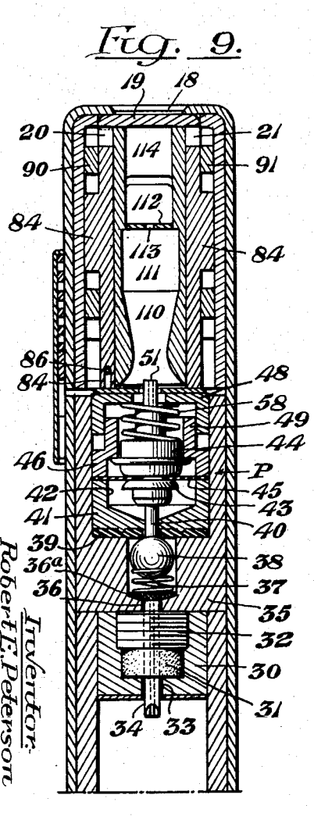
Fig. 9 is a section taken generally along the line 9—9 of Fig. 8.
Figure 10:
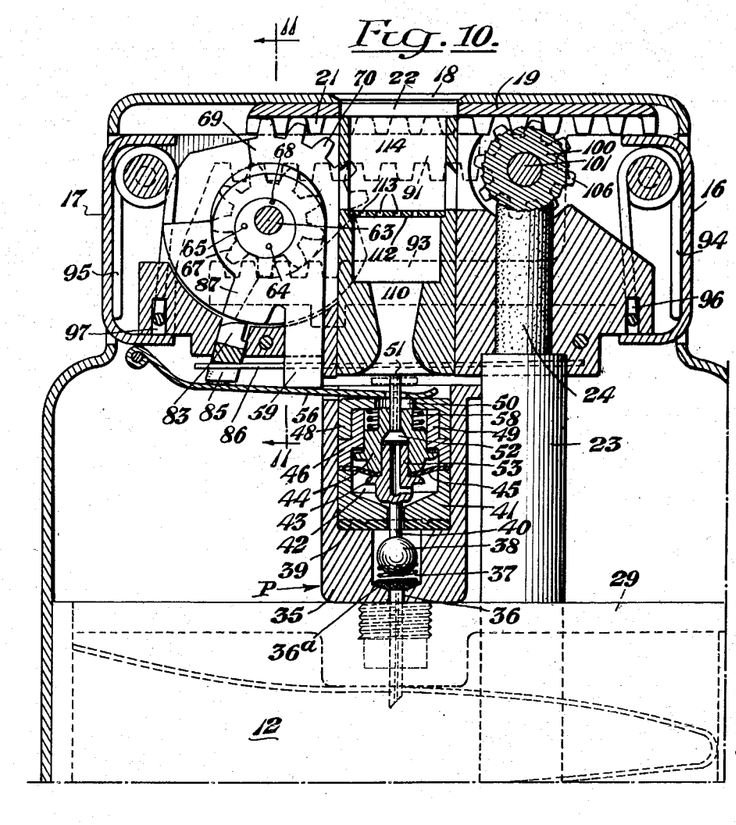
Fig. 10 is a view similar to Fig. 8 showing the operating parts in a second position.
Figure 14:
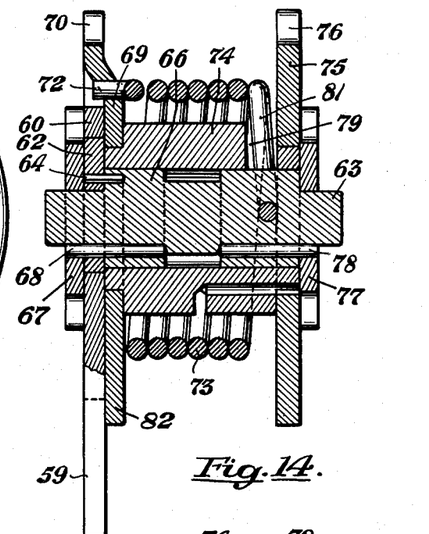
Fig. 14 is a section taken generally along the line 14—14 of Fig. 13.
Figures 15, 16, 17, 18:
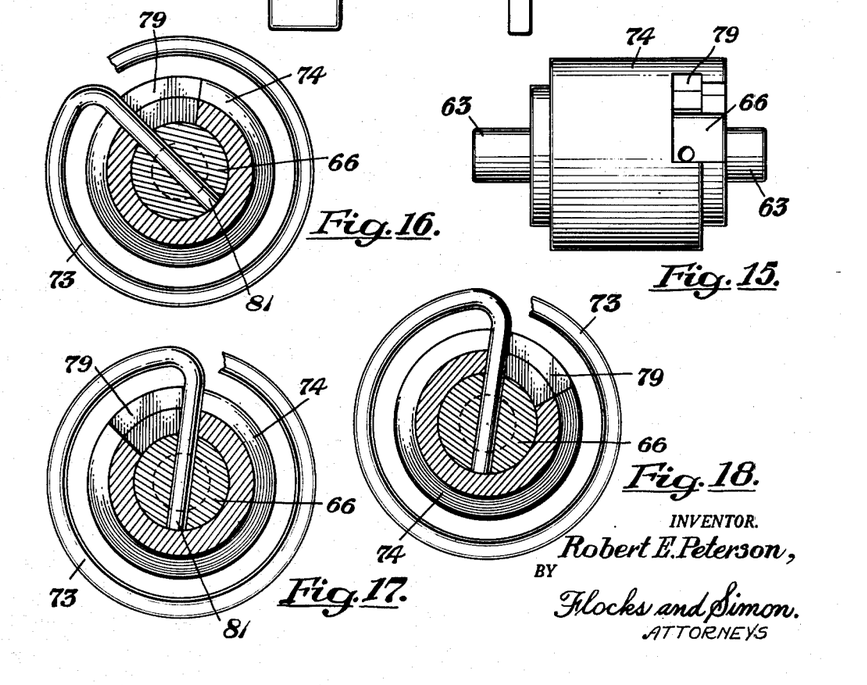
Fig. 15 is a detail of the supporting member for the operating spring.
Fig. 16 is a transverse section of the spring supporting member illustrating the association of the spring therewith.
Fig. 17 is a view similar to Fig. 16 illustrating the spring and associated parts in a second position.
Fig. 18 is a view similar to Figs. 16 and 17 showing the spring and associated parts in a third position.

Positioned within the lighter is a suitable housing member 35 for the combined valve and pressure regulator indicated in general at P, and the upper end of the needle 34 is preferably suitably supported by the lower end of the housing 35 as by welding or soldering as indicated at 36. Within the housing 35 and about the upper end of the needle 34 a suitable spiral spring 37 is provided which serves to normally support the ball 38 forming a part of the ball valve assembly including the ball 38 and the sealing disc 39. A filter 36a is preferably disposed between the top of needle 34 and the bottom of spring 37 to filter the gas flowing into the regulator. As shown in Figs. 8 and 9, the spring 37 is supporting the ball 38 in valve closing position, i. e. in firm sealing relationship to the sealing member or gasket 39. The gasket 39 is provided with a suitable opening to permit the passage of gas therethrough when the ball 38 is in nonsealing or open position, as shown in Fig. 10. A suitable valve stem 40 extends through the opening in the gasket 39 and through another opening within the bushing 41. The bushing 41 is provided with an interior bore 42 which forms a pressure regulating chamber. The upper end of the stem 40 is integral with a rivet member 43 fitted into a second member 44. The two members serve to clamp a diaphragm 45 therebetween. The periphery of the diaphragm 45 is held between the bushing 41 and a second bushing 46, each of the bushings being fitted into the bore 47 in the casing member. Also fitted into the bore 47 is a cap member 48 which is fitted about a reduced end 49 of the bushing 46. The cap member 48 is provided with a central opening 50. Extending through the central opening 50 is a jet tube 51 which communicates with a bore 52 within the member 44. The bore 52 also serves to receive a portion 53 on the lower rivet member 43. Seated on the portion 53 is a filter plate 54 which serves to filter gas passing through the bore 55 in the rivet member 43. Bearing on the upper end of the cap 48 is an operating lever 56 pivoted to the casing at 57. When the operating lever 56 is moved downwardly or in a clockwise direction about the pivot 57 the cap 48 is depressed. This action is communicated to the upper member 44 by the spring 58 mounted about the upper end of the member 44. The operating lever 56 is moved about the pivot 57 by the tail 59 of the operator 60, the upper end of the operator 60 being provided with a circular opening 61 cooperating with an eccentric 62. The eccentric 62 is mounted for rotation on the shaft 63 and is fastened as by the pins 64 and 65 to the drum 66 forming a part of the shaft 63. The eccentric 62 is also keyed to the drum 66 as well as the pinion 67 by the pin 68 (see Fig. 14). As best shown in Fig. 14, the pinion 67 also serves to retain in position the operating member 60 which is freely movable upwardly and downwardly between the pinion 67, a member 69 having an offset gear segment 70 at the upper end thereof. The member 69 is also provided with a plurality of openings 71 which receive one end 72 of a coil spring 73, the spring 73 being mounted about a sleeve 74 rotatably mounted about the drum 66. Also mounted about the drum 66 and capable of movement relative thereto is a rear member 75 provided with a gear segment 76 at the upper end thereof. The teeth of the gear segment 76 are in alignment with the teeth of the gear segment 70 and each of the respective gear segments are in mesh with the racks 20 and 21, respectively, of the closure member 19. The back member 75 is held in position by the pinion 77 which is similar to the pinion 67 and is keyed to the drum 66 by the pin 78 so as to be movable with the drum 66 and the shaft 63. The sleeve 74 is provided with a cutaway portion 79, best shown in Figs. 14 to 18, inclusive. It will also be noted that the drum 66 and shaft 63 are provided with a bore 80 for receiving the inner end 81 of the spring 73. The inner end 81 of the spring passes through the cutaway portion 79 and the cutaway portion, therefore, permits a certain amount of relative movement between the sleeve 74 and the drum 66.

Figure 11:
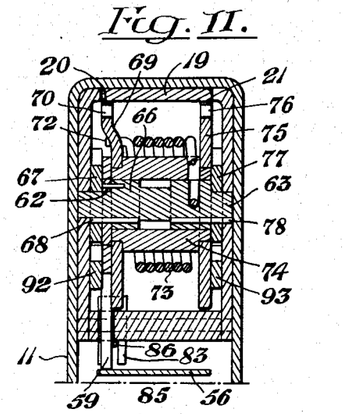
Fig. 11 is a detail section taken generally along the line 11—11 of Fig. 10.
Figure 12:
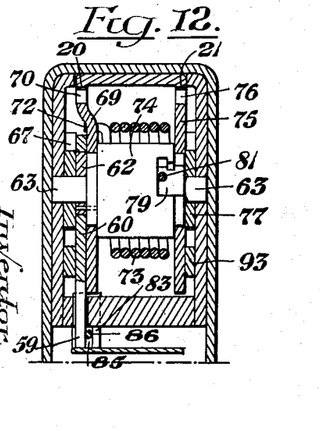
Fig. 12 is a detail similar to Fig. 11 taken generally along the line 12—12 of Fig. 8.
Figure 13:
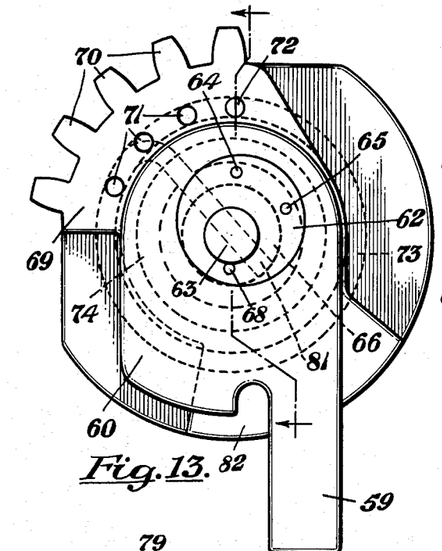
Fig. 13 is a detail of a portion of the operating mechanism.

Referring once again to Figs. 8 and 10, it will be noted that the lower end of member 69 is provided with a generally downwardly extending face 82 and, as shown in Fig. 8, a dog 83 is in contact with the face 82 and prevents any movement of the member 69 in a clockwise direction. The dog 83 is journaled for sliding movement in the block 84 which is suitably fixed in the lighter casing. The lower end of the dog 83 is bifurcated to provide a notch 85 (Fig. 11) which receives a spring 86 normally tending to hold the dog in its upward position, as shown in Fig. 8 and Fig. 12. The operating member 60, in addition to the tail 59, is also provided with a second tail 87 which is normally positioned just above the dog 83, as shown in Fig. 8. Downward movement of the operating member 60, however, will move the dog 83 downwardly to release the member 69, as shown in Fig. 10.

Figures 6, 7:
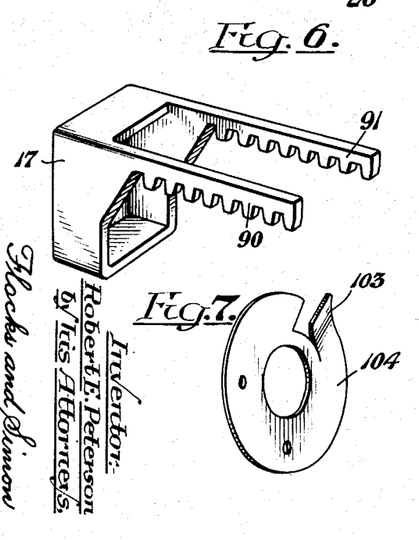
Fig. 6 is a perspective view of one of the manually operated push buttons and operating rack assembly.
Fig. 7 is a perspective view of a portion of the flint wheel clutch.

The previously described push buttons 16 and 17 are each provided with suitable racks which serve to mesh with and rotate the pinions 67 and 77. Referring, for example, to Fig. 6, it will be noted that the push button 17 is provided with a rack 90 which normally meshes with the upper portion of the pinion 67. A second rack 91 is also provided, which similarly meshes with the upper portion of the pinion 77. Similarly the push button 16 is provided with a pair of racks 92 and 93 which mesh with the bottom sides of the pinions 67 and 77, respectively. The push buttons 16 and 17 are normally maintained in the position shown in Fig. 8 by the springs 94 and 95, respectively, which are retained at their inner ends within the notches 96 and 97 in the block 84. The intermediate section of the springs 94 and 95 are wound about the pins 96 and 97, each suitably fastened at their ends to the push buttons 16 and 17, respectively.

The rack members 20 and 21 on the closure member 19 also serve to rotate a flint wheel 100 which is rotatably journaled on a shaft 101. The flint wheel is provided at one of its faces with ratchet teeth 102 cooperating with a pawl 103 struck out of the body of a clutch disc 104. The clutch disc 104 in turn is mounted to rotate with a pinion 105 rotatable with the shaft 101. A similar pinion 106 is also provided which similarly rotates with the shaft 101. Each of the pinions 105 and 106 mesh with the racks 20 and 21, respectively, of the closure member 19.

Referring once again to the jet 51, which serves to initially supply gas from the valve structure previously described, it will be noted that the upper end of the jet 51 (Figs. 8 and 10) terminates within the Venturi tube 110. The Venturi tube 110 serves as a primary mixing zone or carbureting device for air which is drawn into the tube by the action of the high speed gas emitted from the upper end of the jet 51. The primary mixture of gas and air thus produced is fed into a mixing chamber 111 provided with a cover member 112 having a plurality of openings 113 therein. The gas, after thorough admixture with air, is fed through the holes 113 into the combustion chamber 114 for ignition by the igniting mechanism just described. The flame produced in the combustion chamber may be utilized for lighting purposes through the combustion opening 18.

Figure 19:
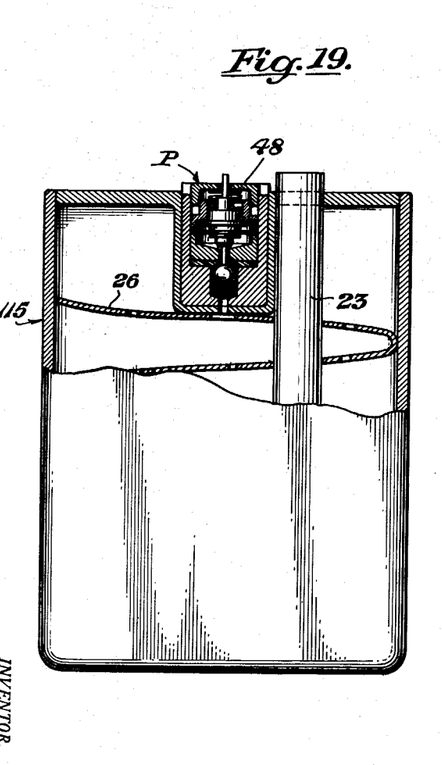
Fig. 19 is a view partly in section of a modified form of the invention.
Figure 20:
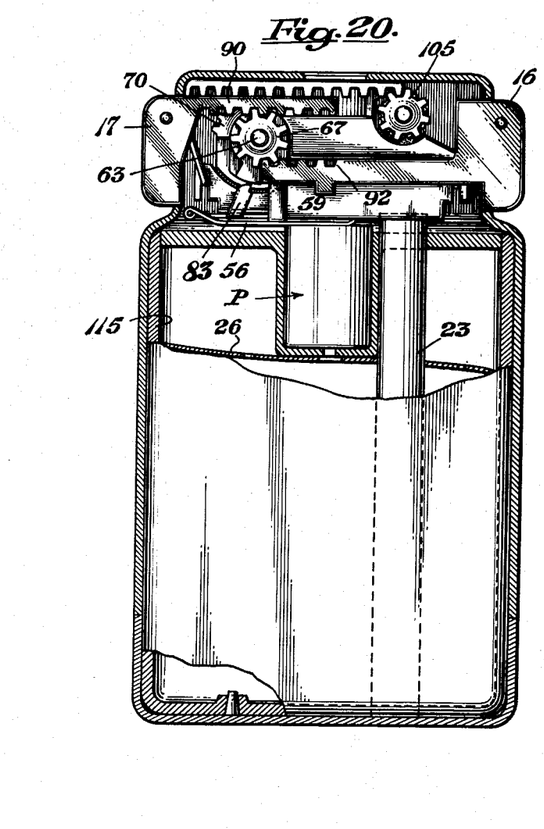
Fig. 20 is an illustration of a modified form of cartridge partly in section.

In Figs. 19 and 20 a modified form of the device is shown, wherein the pressure regulator and valve P is mounted to form an integral part of a modified cartridge 115. As best shown in Fig. 20, it will be noted that in this form the cartridge is substantially larger than in the form heretofore described, thus permitting the use of a larger cartridge. The needle 34 may also be omitted since the valve structure in this form forms a part of the cartridge and will normally be closed to retain the gas therein. However, when inserted within the lighter the lever 56 will similarly be capable of depressing the cap 48, as previously described.

Figure 2:
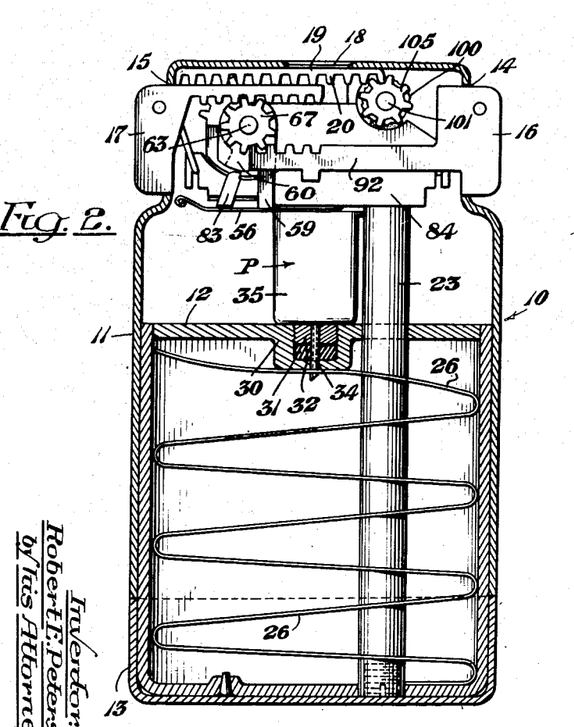
Fig. 2 is a section of the device of Fig. 1.
Figure 3:
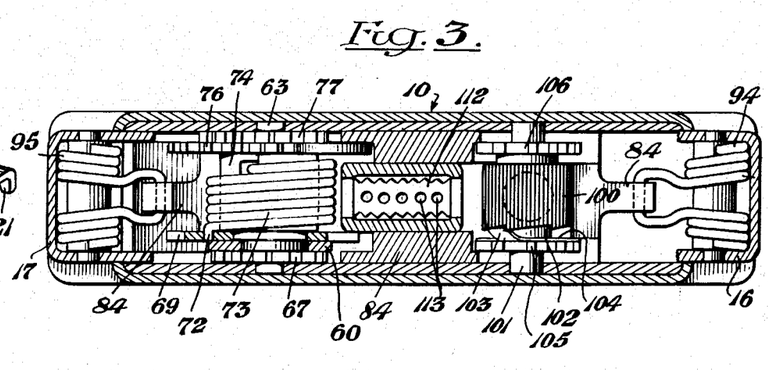
Fig. 3 is a section taken generally along the line 3—3 of Fig. 1.
Figure 4:
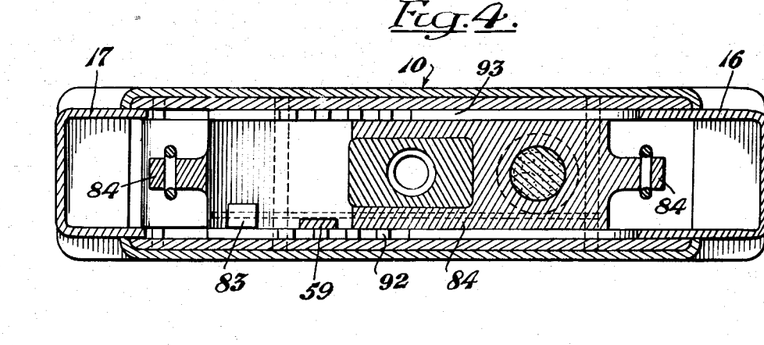
Fig. 4 is a section taken generally along the line 4—4 of Fig. 1.

It is also important in this form of cartridge to provide the reinforcing member 26 hereinabove described with respect to Fig. 2. Through the provision of this reinforcing member or strip 26 bellying of the sides of the cartridge by reason of the substantial pressures to which the cartridge will be subjected when charged is precluded. It is particularly important that this bellying be obviated where the cartridge contains the pressure regulator P in view of the fact that the pressure regulator is necessarily a rather sensitive device that would be in all probability thrown out of adjustment if subjected to the process and inevitably result in bellying of the cartridge sides.

*Operation*

In operating the lighter of the present invention the push buttons 16 and 17 are pressed inwardly relative to the casing, carrying with them the racks 90 and 91 which mesh with the upper portions of the pinions 67 and 77, respectively, and also the racks 92 and 93 which mesh with the lower portions of the aforesaid pinions. This action rotates the pinions in a clockwise direction, similarly rotating the shaft 63 and drum 66. The first action occurring upon this rotation of the pinions and the shaft 63 is the rotation of the eccentric 62. This causes the operator 60 to move downwardly so that the tail 59 of the operator is also moved downwardly to move the operating lever 56 in a downward direction or clockwise direction about the pivot 57. The movement of the lever 56 in turn moves the cap 48 downwardly and serves to compress the spring 58 which forces the member 44 downwardly until the diaphragm 45 is in the position of Fig. 10. This action moves the stem 40 and the ball 38 downwardly to permit flow of gas through the needle 34 and around the stem 40, thence through the bore 55 and the filter 54 and finally through the jet 51. The rapid passage of gas through the jet 51 promotes a flow of air through the Venturi tube 110 and the mixture of gas and air is thoroughly mixed in the chamber 111 and finally fed to the combustion chamber 114. At the same time that this action is taking place and prior to the actual opening of the valve the spring 73 is being wound or tensioned. This action may best be understood by referring to Figs. 16 to 18, inclusive. As may be understood from these figures, rotation of the pinions 67 and 77 moves the shaft 63 and the end 81 of the spring from the position shown in Fig. 16 to the position shown in Fig. 17. This serves to energize the spring 73. The movement of the other end of the spring 72 and the members 69 and 75 is prevented at this time by the engagement of the dog 83 with the surface 82. However, as the operating member 60 moves downward and after the opening of the valve to supply combustion gas, the dog 83 is moved downwardly to release the member 69. The member 69 then moves with the sleeve 74 so that the sleeve occupies the position of Fig. 18. This movement of the sleeve and gear segments similarly moves the closure member 19 to the right uncovering the opening 18 and rotating the pinions 105 and 106 of the igniting mechanism. The rotation of the pinions 105 and 106 through the pawl 103 and ratchet teeth 102 will rotate the flint wheel 100 to supply the spark to the combustion chamber 114, thus igniting the gas and air mixture. Release of the push buttons 16 and 17 will force them outwardly under the influence of the springs 94 and 95 to reverse the rotation of the various parts described and restore the lighter to its original condition. It will be noted that the pressure regulator and valve structure P not only functions to open the valve but also functions as a pressure regulator to prevent the passage of gas through the jet 51 at excessive pressures as pointed out in greater detail in my copending application Serial No. 117,842 filed September 26, 1949. Thus, any excessive pressure at the same diaphragm 45 will tend to move the same upwardly from the position of Fig. 10. This upward movement against the action of spring 58 will tend to bring the ball 38 upwardly to close the valve. The pressure of gas, therefore, through the jet 51, will be determined by the strength of the spring 58 and/or the relative strength of spring 58 and spring 37.

It will be obvious to those skilled in the art that various changes may be made without departing from the spirit of the invention and therefore the invention is not limited to what is shown in the drawings and described in the specification but only as indicated in the appended claims.

I claim:

1. A pyrophoric lighter comprising a receptacle for a low-boiling-point liquified fuel, which is maintained in its liquid form by reason of its own vapor pressure, a combustion outlet for said fuel, valve means communicating with said supply means and said combustion outlet, said valve means when open supplying fuel at constant pressure to said combustion outlet, pyrophoric ignition means adjacent said combustion outlet and operative to ignite said fuel therein upon movement thereof, energizable means movable to and from energized condition for moving said ignition means upon release from energized position, latch means for retaining said energizable means in energized position and manually operable means cooperating with said energizable means, said valve means and said latch means and movable to initially energize said energizable means, further movable to open said valve means and thereafter movable to release said latch means.

2. A pyrophoric lighter comprising a receptacle for a low-boiling-point liquified fuel, which is maintained in its liquid form by reason of its own vapor pressure, a combustion outlet for burning said fuel, valve means communicating with said supply means and said combustion outlet, said valve means when open supplying fuel to said combustion outlet at constant pressure, pyrophoric ignition means adjacent said combustion outlet and operative to ignite said fuel therein upon movement thereof, means for moving said ignition means, a spring having one of its ends cooperating with said last-mentioned means to render last-mentioned means operative to move said ignition means when said spring is energized, latch means for retaining said last-mentioned means in operative condition, and manually operable means cooperating with a second end of said spring, said valve means, and said latch means and movable to initially move said second end of said spring to energize said spring, further movable to open said valve and thereafter movable to release said latch means.

3. In a portable lighter including a casing, a combustion chamber for gaseous fuel within said casing, a receptacle for gaseous fuel within said casing provided with a frangible outlet element, means to connect said receptacle to said combustion chamber, ignition means for igniting fuel in said chamber and manually operative means for operating said ignition means, a valve means forming a part of said connecting means and comprising a valve member movable to open said valve means, movable means adjacent said valve member connected to said manually operative means to be moved thereby, spring means interposed between said movable means and said valve member to transmit movement of said manually actuated means thereto, pressure responsive means to move said valve member against the action of said spring means to close said valve member and a hollow needle-like member forming a part of said connecting means, extending from said valve means and adapted to be forced through said frangible element to establish communication between the interior of said receptacle and said valve means.

4. In a portable lighter including a casing, a combustion chamber for gaseous fuel within said casing, a receptacle for gaseous fuel within said casing, means to connect said receptacle to said combustion chamber, ignition means for igniting fuel in said chamber and manually operative means for operating said ignition means, a valve means within said receptacle forming part of said connecting means and comprising a valve member movable to open said valve, movable means adjacent said valve member connected to said manually operative means to be moved thereby, spring means interposed between said movable means and said valve member to transmit the movement of said manually actuated means thereto, and pressure responsive means to move said valve member against the action of said spring means to close said valve member.

5. A pyrophoric lighter comprising a fuel supply means for gaseous fuel, a combination chamber for burning said fuel, valve means communicating with said supply means and said combustion chamber for supplying fuel to said combustion chamber when opened, pyrophoric ignition means adjacent said combustion chamber and operative to ignite said fuel therein upon movement thereof, rotatable means connected to said ignition means for moving the same upon rotation thereof, cam means mounted concentrically with said rotatable means and movable relative thereto, a spring having one of its ends connected to said cam means and the other of its ends connected to said rotatable means, latch means for preventing rotation of said rotatable means, means operated by said cam means and including one portion operative to open said valve means, and a second portion operative to release said latch means, and manually operable means connected to said rotatable cam means for rotating the same relative to said rotatable means to energize said spring and open said valve and thereafter to release said latch means.

6. A pyrophoric lighter comprising a fuel supply means for gaseous fuel, a combination chamber for burning said fuel, valve means communicating with said supply means and said combustion chamber for supplying fuel to said combustion chamber when opened, pyrophoric ignition means adjacent said combustion chamber and operative to ignite said fuel therein upon movement thereof, rotatable means connected to said ignition means for moving the same upon rotation thereof, cam means mounted concentrically with said rotatable means and movable relative thereto, a spring having one of its ends connected to said cam means and the other of its ends connected to said rotatable means, latch means having a portion projecting into the path of rotation of said rotatable means and spring urged to normally prevent rotation of said rotatable means, movable means cooperating with said cam means and including a relatively long portion operative upon movement to open said valve means and a second relatively short portion cooperating with said latch means and operative upon movement to move said latch means to release said rotatable means and manually operable means connected to said rotatable cam means for rotating the same relative to said rotatable means to energize said spring and simultaneously move said movable means to initially open said valve and thereafter release said latch means.

7. A pyrophoric lighter comprising a fuel supply means for gaseous fuel, a combustion chamber for burning said fuel, valve means communicating with said supply means and said combustion chamber for supplying fuel to said combustion chamber when opened, a lever for operating said valve means, pyrophoric ignition means adjacent said combustion chamber and operative to ignite said fuel therein upon movement thereof, rotatable means connected to said ignition means for moving the same upon rotation thereof, said rotatable means being rotatably mounted upon a shaft, an eccentric mounted upon said shaft and movable therewith, a spring having one of its ends connected to said shaft and the other of its ends connected to said rotatable means, latch means for preventing rotation of said rotatable means and means cooperating with said eccentric and moved thereby, said last-mentioned means including one portion cooperating with said valve lever and a second portion cooperating with said latch means whereby upon movement of said shaft said spring is energized and said last-mentioned means is moved to open said valve and release said latch means.

8. A pyrophoric lighter comprising a fuel supply means for gaseous fuel, a casing having an opening therein, a combustion chamber adjacent said opening for burning said fuel, a closure member for said opening movable to uncover the same, valve means communicating with said supply means and said combustion chamber for supplying fuel to said combustion chamber when opened, pyrophoric ignition means adjacent said combustion chamber and operative to ignite said fuel therein upon movement thereof, energizable means movable to and from energized position for moving said ignition means upon release from energized position and simultaneously moving said closure member, latch means for retaining said energizable means in energized position and manually operable means cooperating with said energizable means, said valve means and said latch means and movable to initially energize said energizable means, further movable to open said valve means and thereafter movable to release said latch means.

References Cited in the file of this patent

UNITED STATES PATENTS

| Number | Name | Date |
|---|---|---|
| 1,544,854 | Mueller et al. | July 7, 1925 |
| 1,828,887 | Aronson | Oct. 27, 1931 |
| 1,863,958 | Wulff et al. | June 21, 1932 |
| 2,019,435 | Blair | Oct. 29, 1935 |
| 2,053,455 | Whittaker | Sept. 8, 1936 |
| 2,153,432 | Reich | Apr. 4, 1939 |
| 2,447,067 | Hamilton | Aug. 17, 1948 |
| 2,482,794 | Peterson | Sept. 27, 1949 |
| 2,495,345 | Quercia et al. | Jan. 24, 1950 |

FOREIGN PATENTS

| Number | Country | Date |
|---|---|---|
| 10,826 | Great Britain | Dec. 5, 1912 |